(12) United States Patent
Isik (10) Patent No.: US 8,890,493 B2
(45) Date of Patent: Nov. 18, 2014

(54) HIGHLY SIMPLIFIED SWITCHING REGULATOR WHICH ALLOWS VERY HIGH SWITCHING FREQUENCIES

(76) Inventor: Tacettin Isik, Saratoga, CA (US)

(*) Notice: Subject to any disclaimer, the term of this patent is extended or adjusted under 35 U.S.C. 154(b) by 508 days.

(21) Appl. No.: 12/981,377

(22) Filed: Dec. 29, 2010

(65) Prior Publication Data

US 2012/0169304 A1    Jul. 5, 2012

(51) Int. Cl.
  H02M 3/157    (2006.01)
  H02M 3/158    (2006.01)
  H02M 3/07     (2006.01)
  H02M 1/00     (2006.01)

(52) U.S. Cl.
  CPC ............... *H02M 3/158* (2013.01); *H02M 3/07* (2013.01); *H02M 2001/0045* (2013.01)
  USPC ................................ 323/266; 307/66; 323/283

(58) Field of Classification Search
  CPC ................ H02M 3/1563; H02M 2001/0045; H02M 3/157; G05F 1/618; G05F 1/563
  USPC ......... 323/266, 280–283, 220–226, 247, 273; 363/59, 65, 74, 123–124; 307/66, 82
  See application file for complete search history.

(56) References Cited

U.S. PATENT DOCUMENTS

| | | | | |
|---|---|---|---|---|
| 4,292,581 A | * | 9/1981 | Tan | 323/283 |
| 5,309,082 A | * | 5/1994 | Payne | 323/270 |
| 5,592,072 A | * | 1/1997 | Brown | 323/268 |
| 5,677,558 A | | 10/1997 | McGlinchey | |
| 5,705,919 A | | 1/1998 | Wilcox | |
| 5,773,966 A | * | 6/1998 | Steigerwald | 323/284 |
| 6,150,798 A | * | 11/2000 | Ferry et al. | 323/273 |
| 6,452,368 B1 | * | 9/2002 | Basso et al. | 323/282 |
| 6,459,246 B1 | | 10/2002 | Roo | |
| 6,489,756 B2 | * | 12/2002 | Kanouda et al. | 323/284 |
| 6,809,504 B2 | | 10/2004 | Tang | |
| 6,960,907 B2 | | 11/2005 | Poss | |
| 6,984,969 B1 | | 1/2006 | Liu | |

(Continued)

OTHER PUBLICATIONS

Isik, T., James, R., title: "Power Reduction Techniques in Mixed Signal Integrated Circuits: Practical Approaches", TechOnLine, Mar. 16, 2009.

(Continued)

*Primary Examiner* — Adolf Berhane
*Assistant Examiner* — Jye-June Lee
(74) *Attorney, Agent, or Firm* — Law Office of Rodney LeRoy (57) ABSTRACT

A voltage regulator circuit includes a linear voltage regulator having a pass transistor and a first feedback from an output load, and a switching regulator having a second feedback from a voltage drop across the pass transistor. The voltage regulator further includes an efficiency monitor configured to detect the voltage drop and control predetermined steps of a duty cycle of the switching regulator based on the voltage drop.

20 Claims, 13 Drawing Sheets

(56) References Cited

U.S. PATENT DOCUMENTS

| | | |
|---|---|---|
| 7,084,612 B2 | 8/2006 | Zinn |
| 7,132,820 B2 | 11/2006 | Walters |
| 7,230,408 B1 | 6/2007 | Vinn |
| 7,378,827 B2 * | 5/2008 | Stoichita ............... 323/285 |
| 7,602,167 B2 * | 10/2009 | Trafton et al. ............ 323/284 |
| 7,970,063 B2 * | 6/2011 | Schulte ................... 375/259 |
| 8,008,960 B2 | 8/2011 | Arduini |
| 2008/0191557 A1 * | 8/2008 | Maireanu et al. ............ 307/66 |
| 2009/0295344 A1 * | 12/2009 | Qu ........................ 323/265 |
| 2012/0169304 A1 | 7/2012 | Isik |
| 2012/0223685 A1 * | 9/2012 | Tsai et al. ................ 323/270 |
| 2013/0147277 A1 * | 6/2013 | Popescu-Stanesti et al. ... 307/66 |

OTHER PUBLICATIONS

Hanh-Phuc, Le , title: "Single Inductor Switching DC-DC Converter With Five Outputs and Ordered Power—Distributive Control", IEEE JSSC, vol. 42, No. 12, Dec. 2007.

\* cited by examiner

HIGHLY SIMPLIFIED SWITCHING REGULATOR WHICH ALLOWS VERY HIGH SWITCHING FREQUENCIES

REFERENCES CITED

U.S. Patents

U.S. Pat. Nos. 5,705,919, 7,084,612, 7,132,820, 20050242792, 20090261790, U.S. Pat. Nos. 5,677,558, 5,592,072, 6,150,798, 6,459,246, 6,809,504, 6,960,907, 7,230,408.

Articles

Isik T., James R., Power Reduction Techniques in Mixed Signal Integrated Circuits: Practical approaches, TechOn-Line, Mar. 16, 2009.

Hanh-Phuc Le et al., Single Inductor Switching DC-DC Converter With Five Outputs and Ordered Power—Distributive Control. IEEE JSSC, Vol. 42, NO 12, December 2007.

FIELD OF THE INVENTION

High efficiency power and voltage regulators.

BACKGROUND OF THE INVENTION

Linear low drop-out voltage regulators (LDOs) are widely used in supplying electronic systems. Their design methods are highly mature. Stability issues are resolved, and fully integrated on-chip versions are helping in the build of complex circuits on a chip without external components (U.S. Pat. No. 6,960,907). One major drawback, however, for such regulators is their efficiency being low. This is the case when the difference between input voltage and regulated output voltage is large.

In order to overcome efficiency, switching regulators have been developed. Switching regulators are based on storing and releasing electrical energy with a controlled duty cycle. Since the switches are completely on or off, these types of regulators do not suffer from wasted energy from the regulating pass transistors of the LDOs which operate in linear mode.

However, energy storage elements used in switching regulators have a few drawbacks. They have undesired parasitics which causes reduction in efficiency. They are also expensive. Most of all, as of yet there is no feasible technique to integrate these components onto the same chip where the rest of the electronic system resides.

One possible solution to integrate the energy storing elements onto a into chip is to increase the switching frequency. High switching frequencies allow these elements to be small in size. One problem is that complex pulse width modulation (PWM) servo mechanisms that are usually based on a sawtooth signal, cause extreme phase shift along the feedback. As frequency increases, stabilizing such a complex system becomes cumbersome. It is possible to simplify the servo system by using bang-bang types of designs. This would deteriorate the performance of the regulator.

Another solution is to make a digital servo mechanism by which stability issues can be partly resolved using elegant digital algorithms. Since an analog to digital converter (ADC) is required to measure the output voltage, the speed of ADC will be the limiting factor of the switching frequency. However, such system gets even more complex and expensive.

The idea of combining LDOs and switching regulators is not new. A discussion was done in part of Isik and James's article "Power Reduction Techniques in Mixed Signal Integrated Circuits: Practical approaches" at Page 3. However, all the prior art known to the inventor suggests that the use of switching regulator in front of the linear regulators will have all disadvantages mentioned above. Some embodiments consist of a switching regulator and a following LDO (U.S. Pat. No. 7,084,612, US20050242792, US20090261790, U.S. Pat. No. 5,592,072), or with another LDO parallel to the switching regulator (U.S. Pat. No. 7,230,408, U.S. Pat. No. 6,984,969) or another LDO (U.S. Pat. No. 6,809,504). These prior art solutions were expected to be fully integrated, since the switching frequency cannot be as high enough, however, full integration is not trivial. For example, in U.S. Pat. No. 7,084,612, feedback from current flow information is used to generate a PWM signal, however, no integration operation which may be essential to stability, is mentioned. Instead, a bang-bang type operation that is not always desirable for various reasons, is suggested.

More importantly, when a linear regulator follows a switching regulator, it is not possible to combine the linear regulator's pass transistor and the high side switch transistor in one. The latter is very important to increase the efficiency further. One of the prior art described in U.S. Pat. No. 6,150,798, makes double use of a high side switch for both linear and switching supply circuits. The usage of a high side switch in this prior art is not continuous. Instead, the mode of operation is selected by external control signals based on input voltage or a sleep condition.

Some recent embodiments take advantage of the fact that many output voltages are needed at the same time. With an elegant design described in Le et. al., only one inductor may serve for producing many voltages without sacrificing efficiency.

The goals of these mentioned prior art were to increase the performance and the efficiency. Although some suggest simplification to a certain extend, they do not bring any significant cost reduction.

BRIEF DESCRIPTION OF THE INVENTION

Storing and releasing electrical energy with a controlled duty cycle is a very well accepted technique for making high efficiency voltage regulators. The traditional duty cycle adjustment is done by a complex, closed loop pulse width modulation (PWM) circuits. This invention makes the PWM system a pseudo open loop digital circuit, while maintaining an analog closed loop with a traditional linear regulator by combining both techniques in a simplified form.

This is achieved by placing the LDO in front of the switching regulator, which is referred as a "voltage shifier" due to its unusual form. While the LDO is regulating the output voltage as usual, the voltage shifter makes sure that the voltage drop across the pass transistor of the LDO is minimal.

DETAILED DESCRIPTION OF THE INVENTION

The description given here is to allow someone of ordinary skill in the art to build and use the present invention in related applications. A variety of modifications on the embodiments described, may be apparent to one skilled in the art and the general principles of the invention described here may be applicable to other embodiments. These other embodiments may be constructed using n-channel transistors instead of p-channel transistors, or vice versa; bipolar transistors instead of mos; different amplifier types instead of what is illustrated here; different digital circuits with similar functionality instead of what is suggested here; different construction topologies which functions similar to what is described here. Therefore, the scope of present invention should not be taken as limited to the particular embodiments illustrated and described herein, but given the widest scope consistent with the principal and novel features disclosed here.

Figure 1:
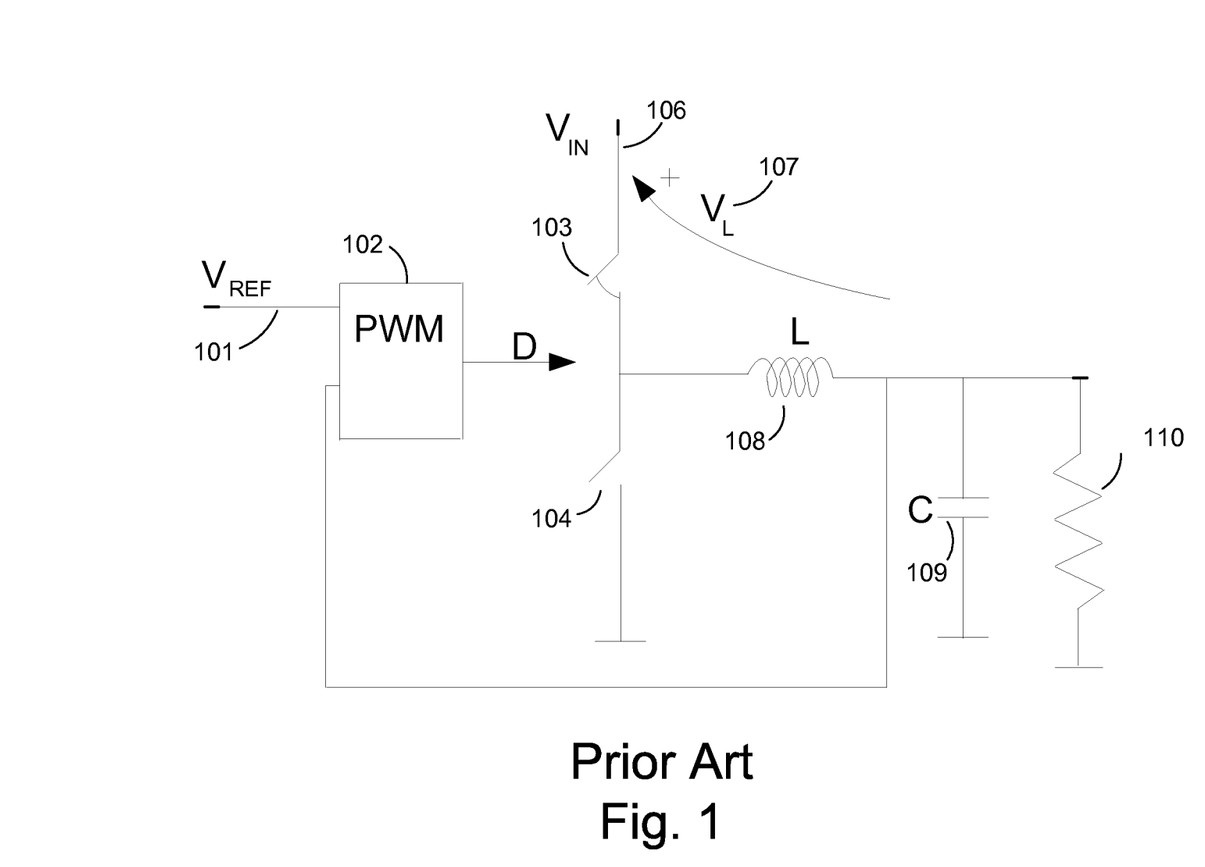
FIG. 1 is a simplified schematic of a PWM based step-down (Buck) converter.

In regards to FIG. 1, a typical switched capacitor step-down voltage regulator that is also known as "buck" regulator, operates based on storing and releasing electrical energy on an inductor (108). The input voltage $V_{IN}$ is applied to node (106). During a period of time when a high side switch (103) is on but a low side switch (104) is off, a certain amount of energy is stored on the inductor. This "stored" energy and also the energy dissipated by the resistive load (110), are coming from the source supply.

When the high side switch (103) is off and the low side switch (104) is on, although no energy is transferred from input source, the inductor continues to keep the amount of the current it was flowing through. By omitting the parasitics of the high side and low side switches (103, 104), the inductor (108) and the capacitor (109); the voltage across the load (110) would be equivalent to $$V_{LOAD} = DV_{IN} \quad (1)$$

where the duty cycle D is defined as $$D = \frac{T_{ON}}{T_{ON} + T_{OFF}} \quad (2)$$

In order to make the load voltage accurately constant, it is compared with a precise voltage reference connected to node (101) and duty cycle (105) is adjusted by a pulse width modulating (PWM) system (102). The details of such operation are explained in many textbooks, articles, and other education materials. The important fact from this invention's point of view is that, even if the duty cycle is not controlled by such a feedback loop system but stays constant, the voltage across the inductor (108) and the switch (107) must remain approximately constant. In other words, $$V_L = (D-1)V_{IN} \quad (3)$$

Looking at equation (1), it is apparent that the output voltage can be adjusted by varying D. If D is dynamically adjusted, any disturbance in the input voltage can be compensated for. This is a traditional way of how a switching regulator is made. However, if D is kept constant and the input voltage is dynamically adjusted, similar control can be exerted over the output voltage. Since controlling the duty cycle without loosing stability of the loop is complicated and involved with special signals, such as a sawtooth waveform, therefore analysis and design and the number of components to be used becomes undesired, and regulation from the input voltage would have advantages.

Figure 2:
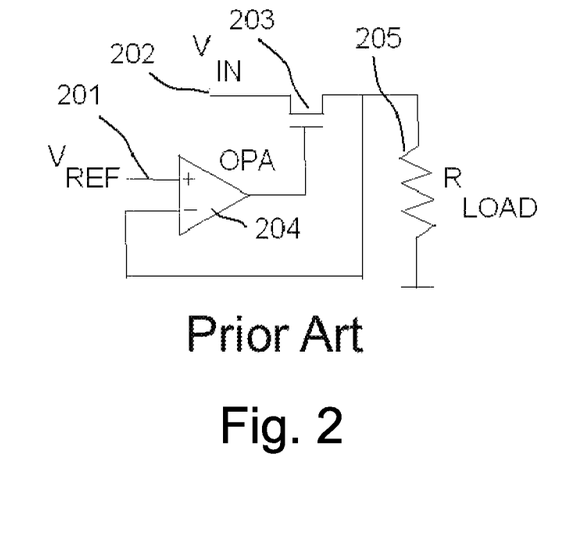
FIG. 2 is a simplified schematic of a linear regulator.

Adjusting the input voltage can be done by using a linear regulator illustrated in FIG. 2. Although variants of this type of regulator exist, the basic principle is more or less the same. A high gain operational amplifier (204) drives a pass transistor (203). In simple terms, the pass transistor's resistance is adjusted in such a way that with the voltage division, a desired voltage across the load (205) can be achieved from input (202). To do this, the operational amplifier compares the output voltage and a precision reference voltage (201) and tries to make them the same. For simplification purposes, neither stability compensation nor other circuit techniques that make this circuit work properly are illustrated in this figure.

When the ratio of the voltage at the output and input gets smaller, the efficiency of a linear regulator becomes poor. This is simply because the dissipated power on the pass transistor is not useful. Other than efficiency, linear regulators are far better than their switching counterparts, in terms of electrical properties and design ease. It would be obvious to the one skilled in art that if the voltage across the pass transistor is kept small, then the downside of this type of regulator may be eliminated.

Figure 4:
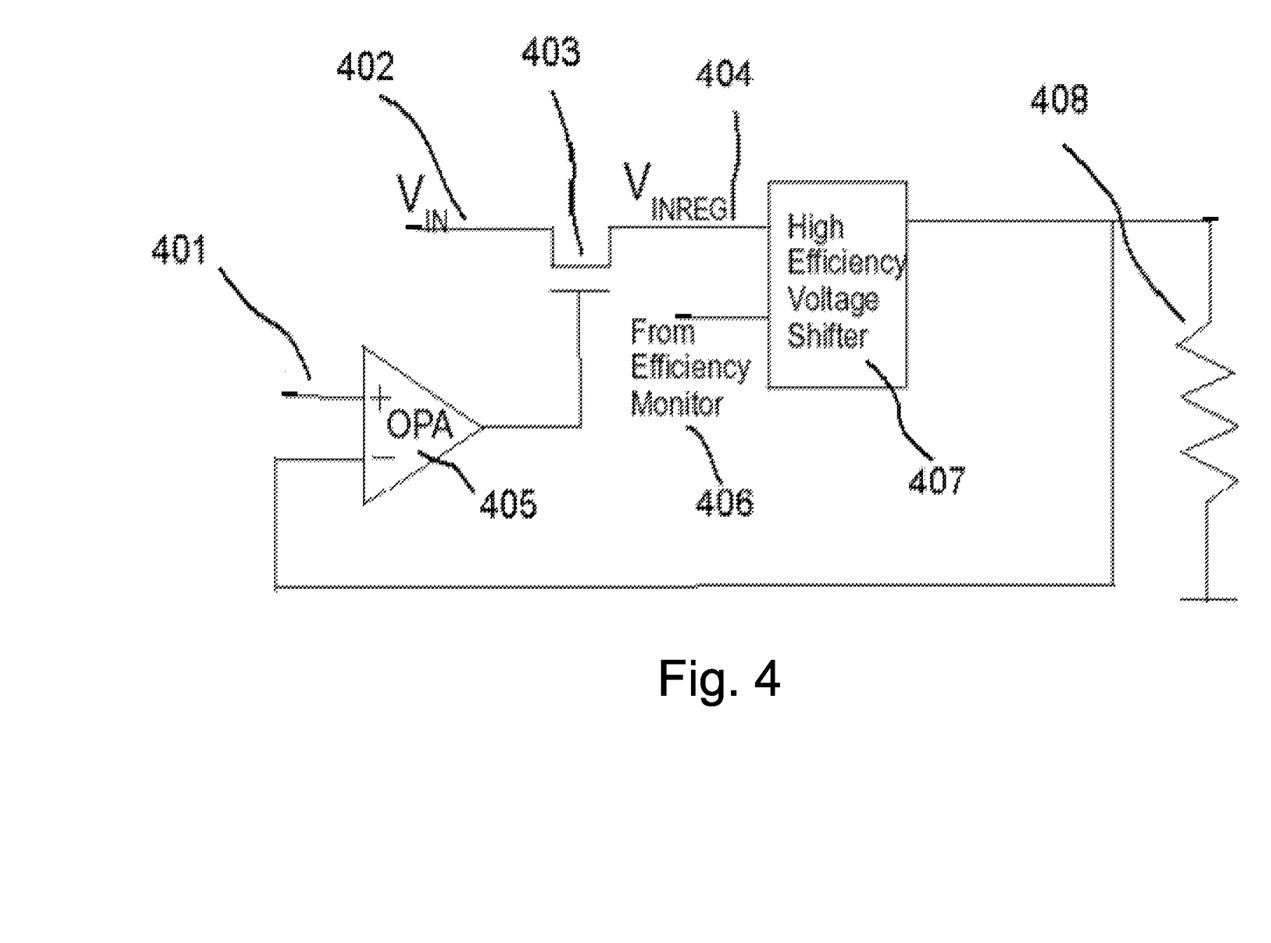
FIG. 4 is a simplified schematic of a linear regulator with series a high efficiency voltage shifter.

Referring to FIG. 4, an embodiment of such a system is illustrated. By using a high efficiency voltage shifter (407) the voltage across the pass transistor is minimized. This system is exactly same as the linear regulator drawn in FIG. 2 with the addition of voltage shifter 407. In this embodiment, the voltage across the voltage shifter is set to an appropriate value. This value can also be dynamically adjusted by looking at efficiency behavior of the entire system. The input to voltage shifter is indicated in FIG. 4 by reference number (406). In essence, since the voltage across the pass transistor is a good measure of the efficiency, some embodiments can simply check this voltage and set the voltage across the voltage shifter. The linear loop still compares the output voltage with a reference voltage (401) using operational amplifier (405) and controls the resistance of pass transistor (403). This is done in such a way that the difference between input voltage (402) and output voltage (404) is essentially minimized. Making the assumption that the voltage difference between node (404) and voltage across load (408) remains constant, the output voltage can be regulated without sacrificing efficiency.

Figure 5:
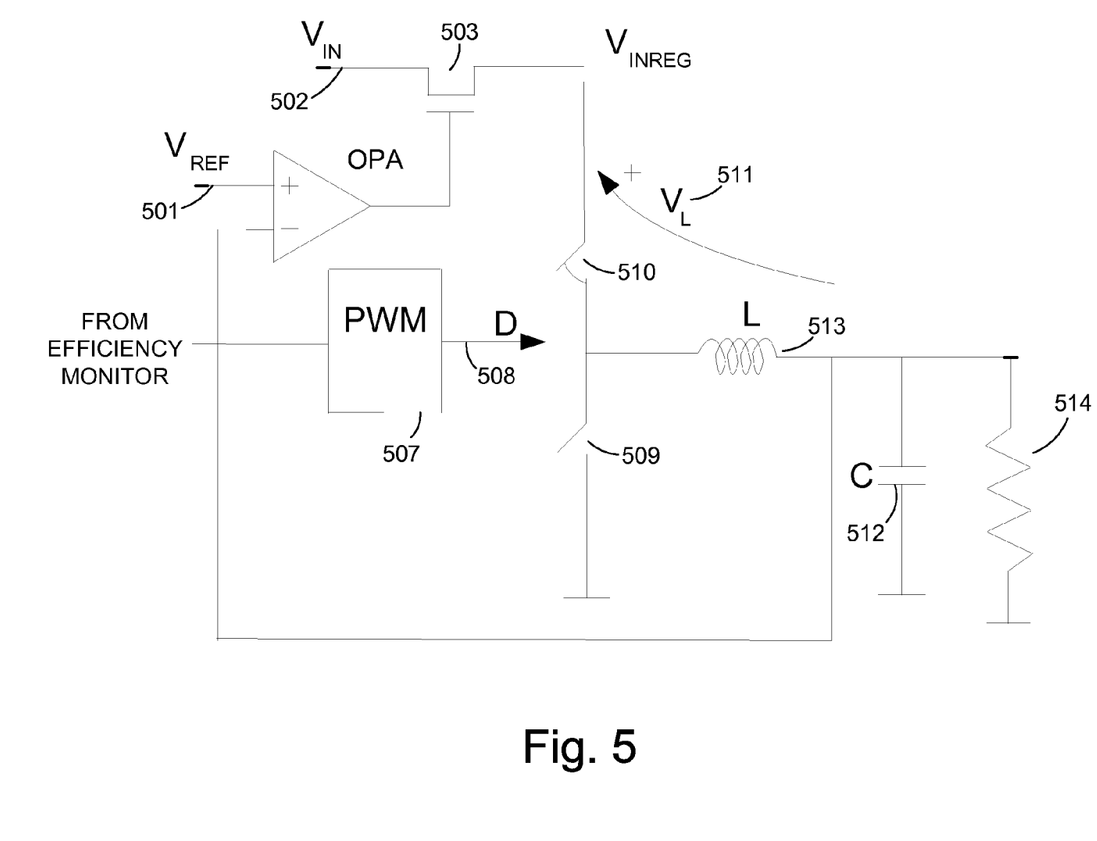
FIG. 5 is a simplified schematic of a linear regulator with a buck converter as a voltage shifter.

In FIG. 5 is a simplified image of the buck regulator shown in FIG. 1 configured for use as high efficiency voltage shifter for the linear regulator shown in FIG. 2. The difference here is that the switching regulator is not in a dynamic loop. The duty cycle (508) is set and not changed unless some efficiency drop or mode of operation (continuous-discontinuous) change occurs.

Figure 6:
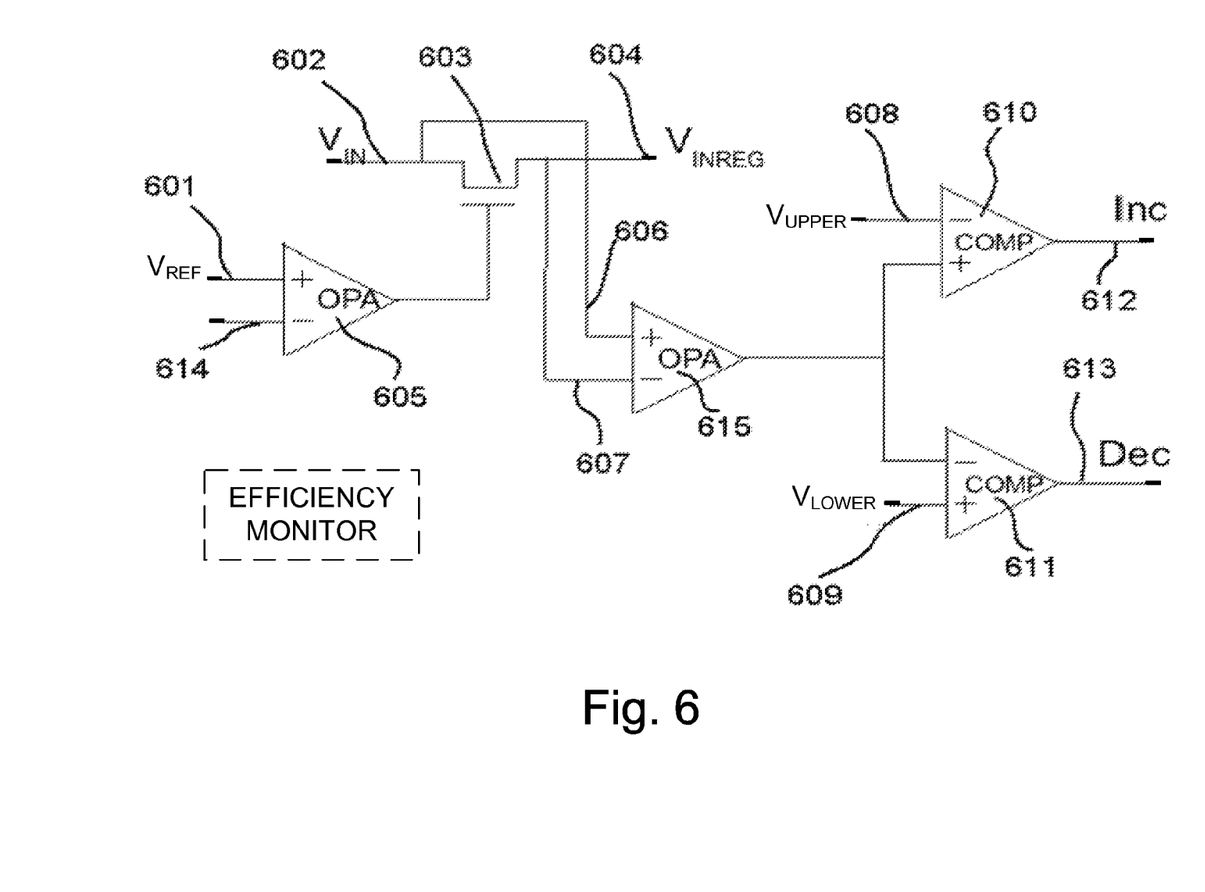
FIG. 6 is a simplified schematic of an efficiency monitor according to one possible embodiment.

FIG. 6 illustrates one of many possible implementations of an efficiency monitor according to embodiments of the present invention. The linear regulator's pass transistor (603) and its driving amplifier (605) are added for clarity. As mentioned earlier, the voltage across transistor (603) must be kept substantially to a minimum. The amplifier (615) measures this differential voltage and converts it to a signal referenced to the ground. Gain of this amplifier is set to a known and invariant value. The output is fed to two comparators (610) and (611), compared with respect to two known values Vupper (608) and Vlower (609). The output of these comparators generates logic signals (612) and (613), named Inc and Dec, attributing either Increment and Decrement, or Increase and Decrease, depending on the embodiment that follows. For example, if this efficiency monitor drives the PWM (507) system shown on FIG. 5, these signals will increase or decrease the duty cycle. In other words, if the voltage across the pass transistor is larger than the upper reference voltage, the duty cycle will be increased to compensate, or vice versa. This embodiment can be used for current limiting feature of the entire regulator with an additional comparator.

Figure 7:
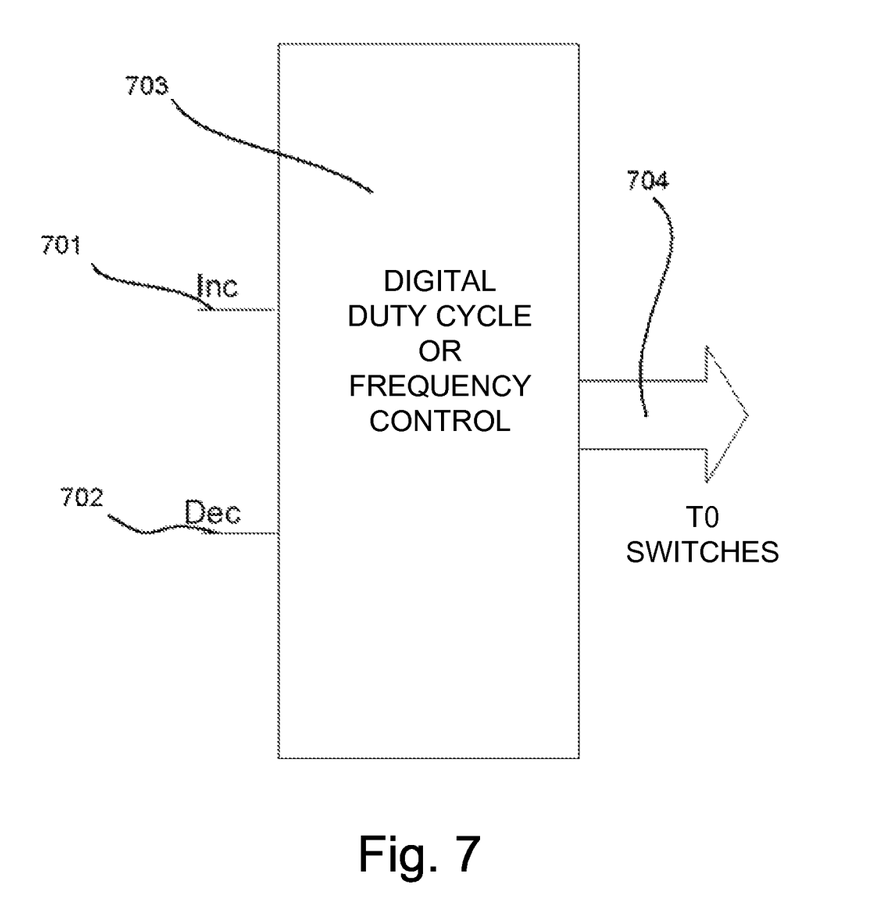
FIG. 7 is a simplified schematic of a digital duty cycle or frequency control driven by efficiency monitor.
Figure 8:
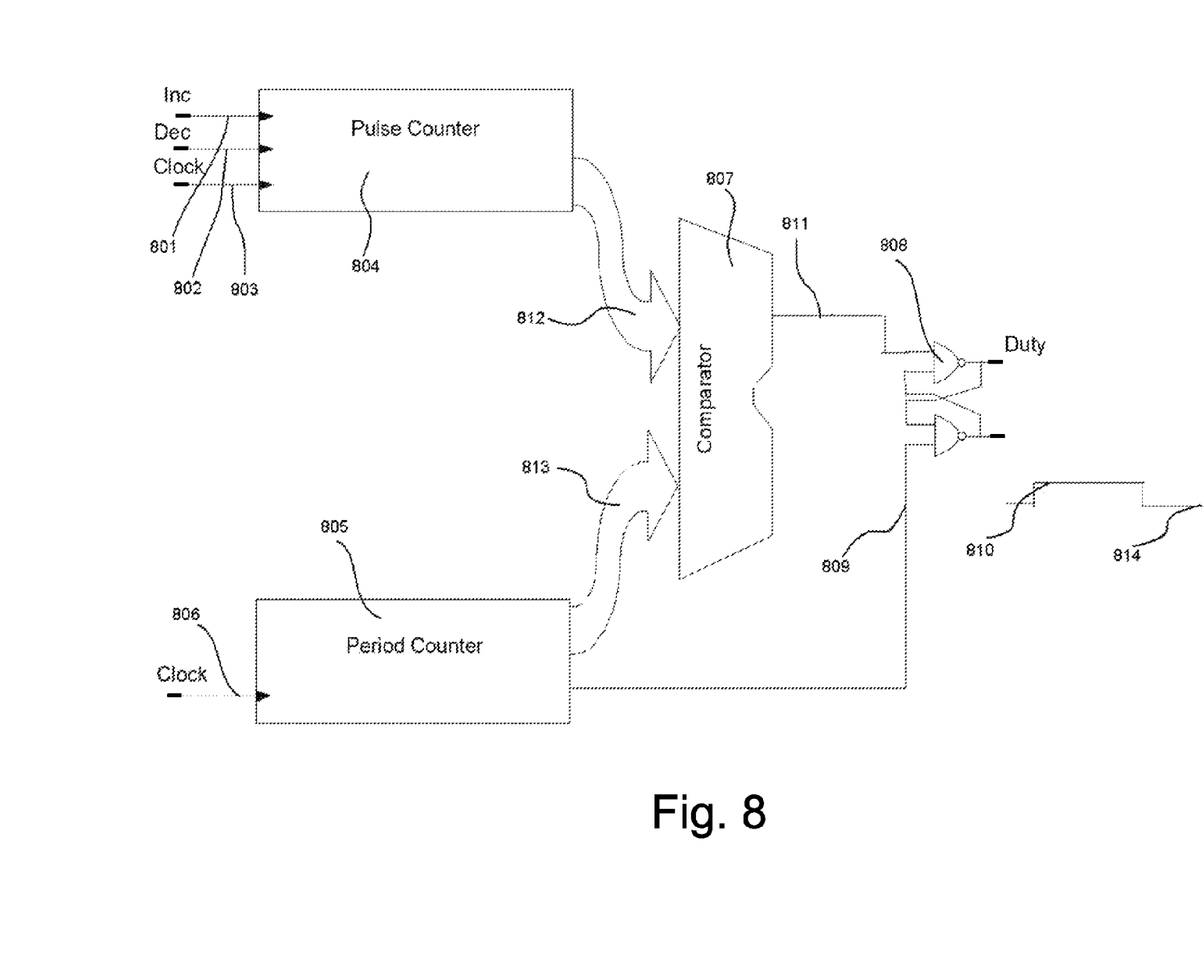
FIG. 8 is a simplified schematic of a digital duty cycle control circuit according to one possible embodiment.

In FIG. 7, an electronic circuit block shown to generate signals (704) for controlling switches in the high efficiency voltage shifter. Since various embodiments can be used for voltage shifter, this block (703) can convert Inc (701) and Dec (702) signals into either a duty cycle based or frequency based signals. An example duty cycle control logic which may be replaced with the block shown in FIG. 7, is illustrated in FIG. 8. When a clock is provided to input (803) or input (806), two counters starts counting. If a count value (813) in the period counter (805) reaches the value (812) in the Pulse counter (804), a digital comparator (807) sends a signal (811) to a set-reset latch (808) to toggle. When the entire period is reached, period counter output (809) toggles the latch back. The period counter can be made programmable to set a desired period, however, maximum count of both counters should be the same to ensure a 100% duty cycle. Since the period counter holds the previous value if there is no change on the Inc and Dec signals, such a system acts as an integrator and helps the stability and also helps soft start operation naturally.

Figure 9:
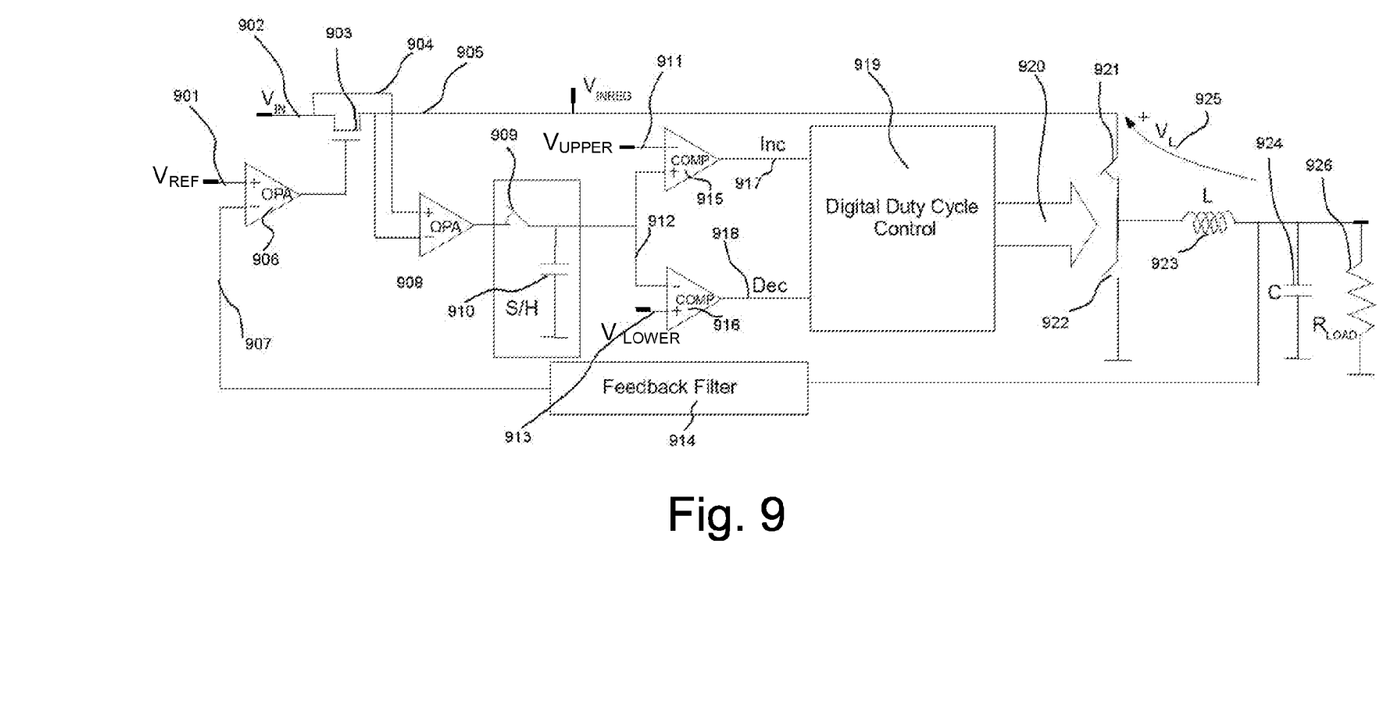
FIG. 9 is a simplified schematic of a linear regulator with pseudo-digital buck converter configured to operate as a voltage shifter.

FIG. 9 illustrates the embodiment combining a linear regulator, a switching (buck type) step-down regulator, an efficiency monitor, and a duty cycle generator. Due to the fact that signals and power are switched, a sample and hold (S\H) block built out of a switch (909) and a capacitor (910) are added to efficiency monitor. The S\H ensures that the efficiency is measured only when high side switch (921) is on. In this embodiment, a feedback filter (914) is placed to eliminate instability issues.

Figure 10:
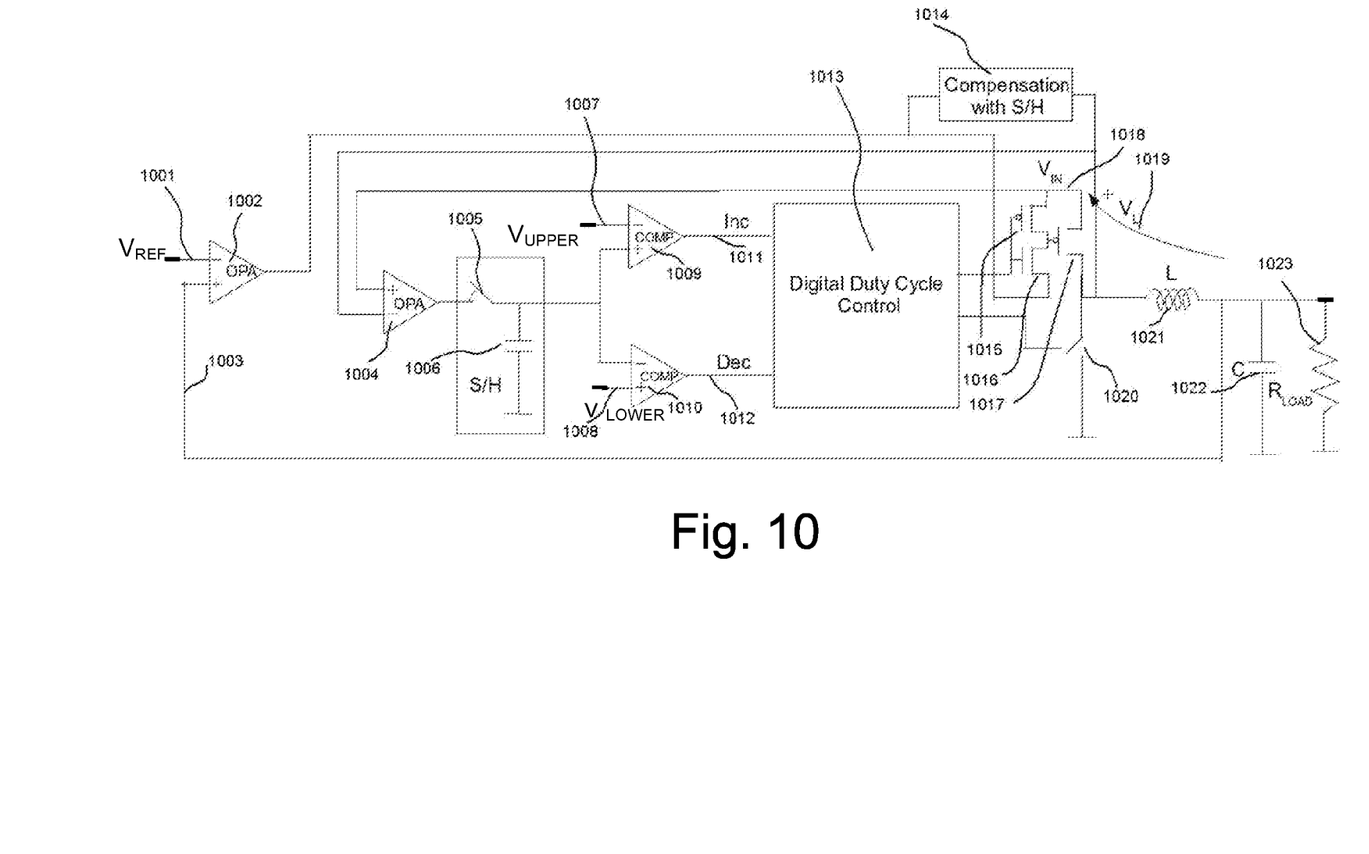
FIG. 10 is a simplified schematic of a linear regulator with a pass transistor and a high side switch of a buck converter combined.

The embodiment shown in FIG. 10 brings further improvement over what is in FIG. 9. The pass transistor and the high side switch are incorporated in the same transistor (1017). The gate of transistor (1017) is driven by transistors (1015) and (1016). If transistor (1017) is off, then transistor (1015) is on and transistor (1016) is off. If transistor (1017) is on, transistor (1015) is off, then transistor (1016) is on and passes the analog signal, which the linear regulator amplifier generates, to the gate of transistor (1017). In this embodiment the feedback stability filter is replaced with a compensation network (1014) with a S\H across the output transistor.

Figure 11:
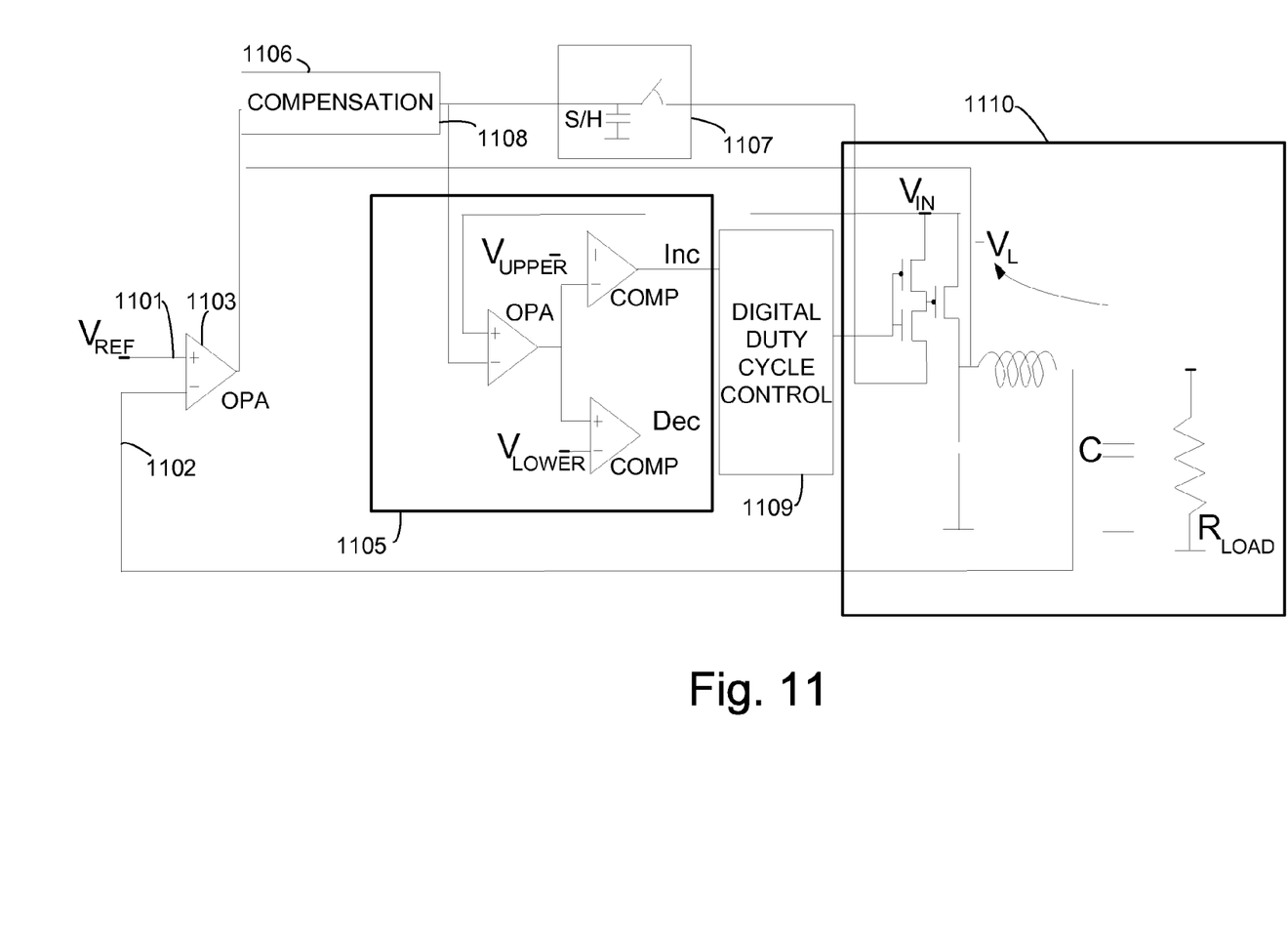
FIG. 11 is a simplified schematic of a simplified circuit using a common sample-and-hold (SIH) for compensation and for the efficiency monitor.

In FIG. 11, the topology is modified slightly to reduce the need of two S\H circuit (1107) to one.

One of the advantages of this invention is to be able to switch the switching regulator switches faster. This is because they are not part of the main loop so that there is no unwanted latency. The higher switching frequency leads to smaller inductors. Even then, this may not help to build fully integrated regulators unless switching frequency is at gigaHz levels. An alternative might be a switched capacitor (or charge redistribution) type of step-down converters.

Figure 3:
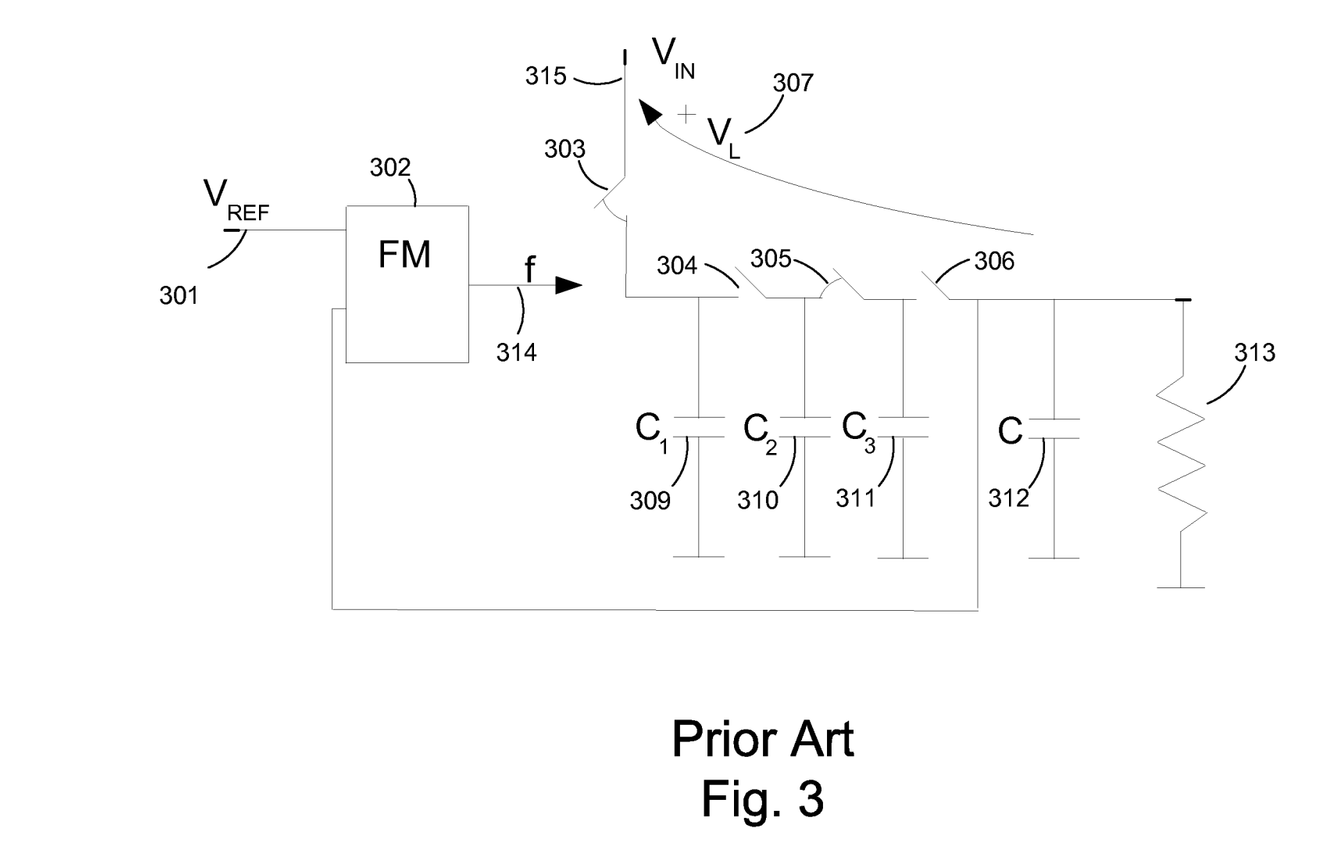
FIG. 3 is a conceptual schematic of a switched capacitor step-down converter.

A simplified switched capacitor step-down converter is illustrated in FIG. 3. In such embodiments, switches (303, 304, 305, 306) are driven by non-overlapping but alternating signals to transfer charge from input voltage supply (315) to the load (313). Every charge transfer causes a charge distribution between shorted capacitors which may be (309, 310, 311, 312). This process reduces the voltage 307 to a desired level. As the voltage reduction amount can be adjusted by using predetermined capacitance values, it can also be determined by using variable switching frequency (please refer to Isik and James' U.S. patent application Ser. No. 12/981,377 for a better explanation). This is true 44' only if there is always a load current. Therefore, a feedback from the output is compared with a precision voltage reference (301) and a frequency modulator circuitry (302) generates a signal (314) to control the switches. Advantages of such an embodiment over a buck converter is that it is inductor free and frequency can be increased to much higher levels. These two advantages can lead to fully integrated implementation.

Figure 12:
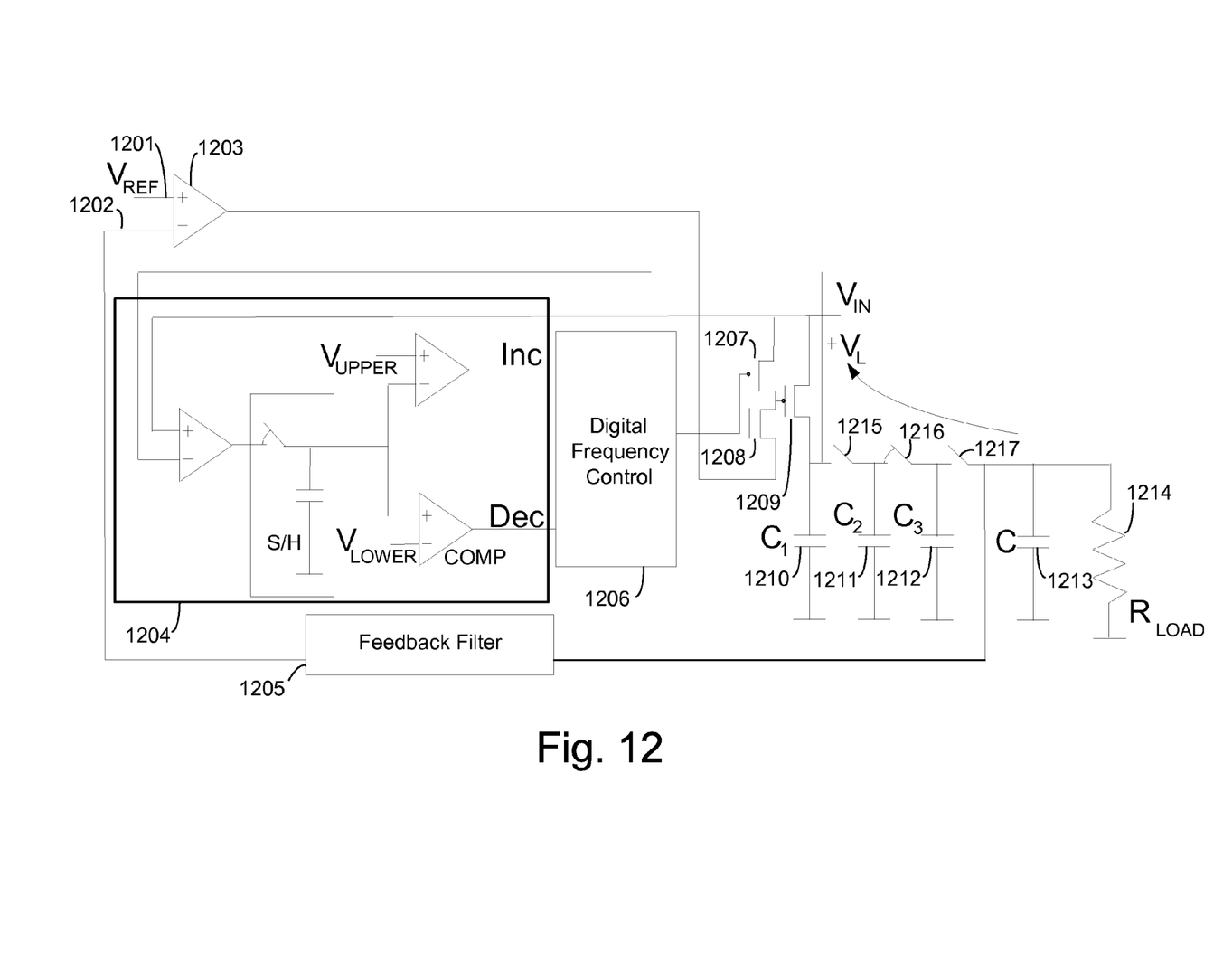
FIG. 12 is a simplified schematic of a switched capacitor converter and linear regulator combination according to one possible embodiment.

FIG. 12 illustrates an embodiment which is very similar to the embodiment shown in FIG. 10. The difference is that the high efficiency voltage shifter is replaced with a switched capacitor regulator. It should also be obvious to one skilled in art that the duty cycle control block is replaced by a frequency control block (1206).

Figure 13:
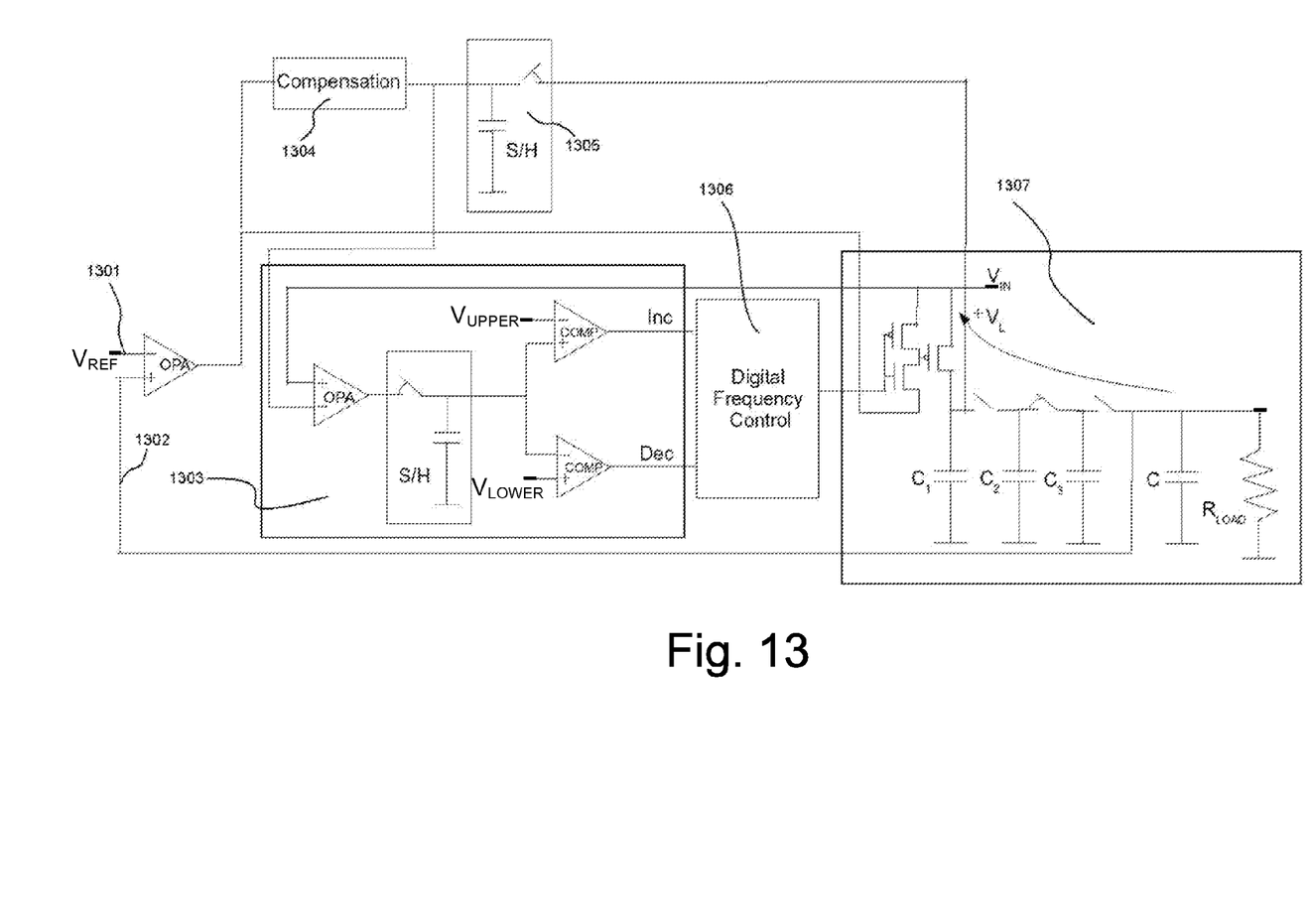
FIG. 13 is a simplified schematic of a switched capacitor style implementation with common SIH.

FIG. 13. is a simplified schematic of an embodiment with enhancements similar to those enhancements shown in FIG. 11.

I claim:

1. A voltage regulator circuit comprising:
a linear voltage regulator having a pass transistor and a first feedback configured to feedback from an output load to a control terminal of the pass transistor, wherein the pass transistor includes an input terminal, which is configured to be connected to an input voltage, and an output terminal;
a switching regulator configured to operate temporally simultaneously with the linear voltage regulator and having:
a second feedback from a voltage drop across the pass transistor;
a high-side switch and a low-side switch, wherein the high-side switch is coupled between the output terminal of the pass transistor and the low-side switch, and the low-side switch is coupled between the high-side switch and ground, a mid-node of the high-side switch and the low-side switch is coupled to a circuit output;
a digital duty cycle controller connected to the high-side switch and low-side switch and configured to control a duty cycle of the high-side switch and low-side switch based on the voltage drop; and
an efficiency monitor coupled to the second feedback and configured to detect the voltage drop and control predetermined steps of the duty cycle of the switching regulator based on the voltage drop.

2. The voltage regulator circuit of claim 1 wherein:
the linear voltage regular includes an op-amp coupled to the pass transistor, and
the op-amp is configured to control the pass transistor.

3. The voltage regulator circuit of claim 2 wherein the op-amp is configured to control the voltage drop across the pass transistor.

4. The voltage regulator circuit of claim 2 further comprising a feedback filter coupled to the op-amp and configured to stabilize the linear voltage regulator.

5. The voltage regulator circuit of claim 1, wherein:
the efficiency monitor comprises first and second comparators coupled to the second feedback,
the first comparator changes the duty cycle by a first predetermined step if the voltage drop is greater than a first reference voltage for a first time period, and
the second comparator changes the duty cycle by a second predetermined step if the voltage drop is less than a second reference voltage.

6. The voltage regulator circuit of claim 5, wherein the first reference voltage is greater than the second reference voltage.

7. A voltage regulator circuit comprising:
a linear voltage regulator having a pass transistor and a first feedback configured to feedback from an output load;
a digital frequency controller configured to:
couple an input voltage or a linear feedback, which is generated by the linear voltage regulator, to a control terminal of the pass transistor, via a first switch or a second switch, respectively, wherein the first and the second switches are arranged in series between an input voltage node and a linear feedback node, and
provide a frequency signal to the first and the second switches to control a switching frequency of the first and the second switches to couple the input voltage or the linear feedback to the control terminal;
a switched capacitor regulator coupled between the pass transistor and ground, wherein a mid-node between the pass transistor and the switched capacitor regulator is an output node; and
an efficiency monitor connected to the digital frequency controller and configured to detect a voltage drop across the pass transistor and control predetermined steps of the frequency signal of the digital frequency controller based on the voltage drop.

8. The voltage regulator circuit of claim 7 wherein the pass transistor is a high-side switch coupled between an input voltage and the switched capacitor regulator, wherein the switched capacitor regulator is coupled between the high-side switch and ground.

9. The voltage regulator circuit of claim 8 wherein:
if the high-side switch is supposed to be off, the frequency signal of the digital frequency controller is configured to turn off the high-side switch; and
if the high-side switch is supposed to be on, the linear feedback is configured to control the high-side switch.

10. The voltage regulator circuit of claim 9 wherein if the high-side switch is on, a pulse signal of the digital frequency controller lets the linear feedback linearly control the high-side switch.

11. The voltage regulator circuit of claim 8 wherein:
if the high-side switch is supposed to be off, the digital frequency controller is configured to turn on the first switch and turn off the second switch to couple the input voltage to a control gate of the high-side switch to turn off the high-side switch,
if the high-side switch is supposed to be on, the digital frequency controller is configured to turn off the first switch and turn on the second switch to couple the linear feedback to the control gate of the high-side switch to turn on the high-side switch.

12. A voltage regulator circuit comprising:
a linear voltage regulator comprising:
a pass transistor;
an operational amplifier; and
a first feedback configured to feedback from a circuit output to an input of the operational amplifier, wherein:
the pass transistor comprises an input terminal connected to an input voltage node, and an output terminal coupled to the circuit output,
an output terminal of the operational amplifier is connected to a control terminal of the pass transistor via a first switch, and
the input voltage node is connected to the control terminal of the pass transistor via a second switch, which is in serial with the first switch; and
a switching regulator comprising:
a second feedback across the input terminal and the output terminal of the pass transistor and configured to feedback a voltage drop across the pass transistor,
a high-side switch and a low-side switch, wherein:
the high-side switch is the pass transistor and is coupled between an input voltage node and the low-side switch,
the low-side switch is coupled between the high-side switch and ground,
a mid-node of the high-side switch and the low-side switch is coupled to the circuit output, and
a digital duty cycle controller connected to the first switch, the second switch, and the low-side switch for generating a duty cycle control signal for controlling a duty cycle of the high-side switch and the low-side switch based on the voltage drop; and
an efficiency monitor connected to the digital duty cycle controller configured to detect the voltage drop and control the digital duty cycle controller to control predetermined steps of the duty cycle control signal based on the voltage drop.

13. The voltage regulator circuit of claim 12 wherein the linear voltage regulator and the switching regulator are operable together for controlling an output voltage that is output from the mid-node.

14. The voltage regulator circuit of claim 12 wherein the op-amp is configured to control the voltage drop across the pass transistor.

15. The voltage regulator circuit of claim 12 further comprising a compensation network coupled to the op-amp, wherein the compensation network and the op-amp form a linear feedback circuit configured to provide linear feedback control of the high-side switch.

16. The voltage regulator circuit of claim 15 wherein:
if the high-side switch is supposed to be off and the low-side switch is supposed to be on, the duty cycle is configured to turn off the high-side switch; and
if the high-side switch is supposed to be on and the low-side switch is supposed to be off, the linear feedback circuit is configured to control the high-side switch via the linear feedback control.

17. The voltage regulator circuit of claim 16 wherein:
the duty cycle controller is coupled between the efficiency monitor and the high-side and the low-side switches,
the duty cycle controller is configured to generate the duty cycle control signal based on an efficiency of the pass transistor, and
if the high-side switch is on, the duty cycle control signal is configured to allow the linear feedback circuit to linearly control the high-side switch.

18. The voltage regulator circuit of claim 15 wherein the linear feedback circuit includes a sample and hold circuit configured to receive and hold the linear feedback control for controlling the high-side switch, and wherein the linear feedback circuit is configured to stabilize the linear voltage regulator.

19. The voltage regulator circuit of claim 18 wherein the sample and hold circuit is coupled to an input of the efficiency monitor and an input of the linear feedback circuit.

20. The voltage regulator circuit of claim 12 wherein the digital duty cycle controller is configured to change the duty cycle if the voltage drop across the pass transistor is below a lower threshold voltage for a first period of time or if the voltage drop across the pass transistor is above an upper threshold voltage for a second period of time.

* * * * *